(12) United States Patent
Lagace, Jr.

(10) Patent No.: US 6,354,044 B1
(45) Date of Patent: Mar. 12, 2002

(54) PORTABLE COMPACT THEATRE BOOTH

(76) Inventor: Kenneth A. Lagace, Jr., 18 Danielle Rd., Granby, CT (US) 06035

( * ) Notice: Subject to any disclaimer, the term of this patent is extended or adjusted under 35 U.S.C. 154(b) by 0 days.

(21) Appl. No.: 09/620,668

(22) Filed: Jul. 20, 2000

(51) Int. Cl.$^7$ ................................................ E04H 1/00
(52) U.S. Cl. ................ 52/79.5; 312/223.3; 297/184.14; 297/184.15; 434/38; 434/69; 434/61
(58) Field of Search ................ 52/79.5, 143; 312/223.3, 312/235.8; 297/184.14, 184.15, 217.5, 217.3, 217.4, 184.11; 434/38, 69, 61, 55

(56) References Cited

U.S. PATENT DOCUMENTS

| | | | |
|---|---|---|---|
| 3,799,608 A | * 3/1974 | Smutny et al. | 297/184 |
| 3,902,264 A | * 9/1975 | Radig | 43/1 |
| 4,695,903 A | 9/1987 | Serap et al. | 358/335 |
| 4,788,997 A | * 12/1988 | Clopton | 135/117 |
| 4,826,245 A | 5/1989 | Entratter | 297/217 |
| 4,971,089 A | * 11/1990 | Braman | 135/90 |
| 4,987,706 A | 1/1991 | Hughes et al. | 52/79.5 |
| 5,275,482 A | 1/1994 | Grant | 312/235.9 |
| 5,573,320 A | 11/1996 | Shearer | 312/223.3 |
| 5,993,216 A | 11/1999 | Stogner | 434/29 |

FOREIGN PATENT DOCUMENTS

GB  2052960 A  * 2/1981  ................ 135/117

* cited by examiner

Primary Examiner—Carl D. Friedman
Assistant Examiner—Naoko Slack
(74) Attorney, Agent, or Firm—Cantor Colburn LLP

(57) ABSTRACT

A portable viewing booth adapted to accommodate a viewer therein. The viewing booth comprising a chair having a seat portion, a back rest portion, a pair of arm rests, and a leg rest. The portable viewing booth is adapted to be transported on a roller. The portable viewing booth further includes a frame member adapted to cover the viewer seated on the chair, wherein the frame member is adapted to house a screen display thereon, and wherein the frame member is pivotally attached to an upper edge of the back rest portion of the chair, and is adapted to fold and be disposed behind the chair.

14 Claims, 8 Drawing Sheets

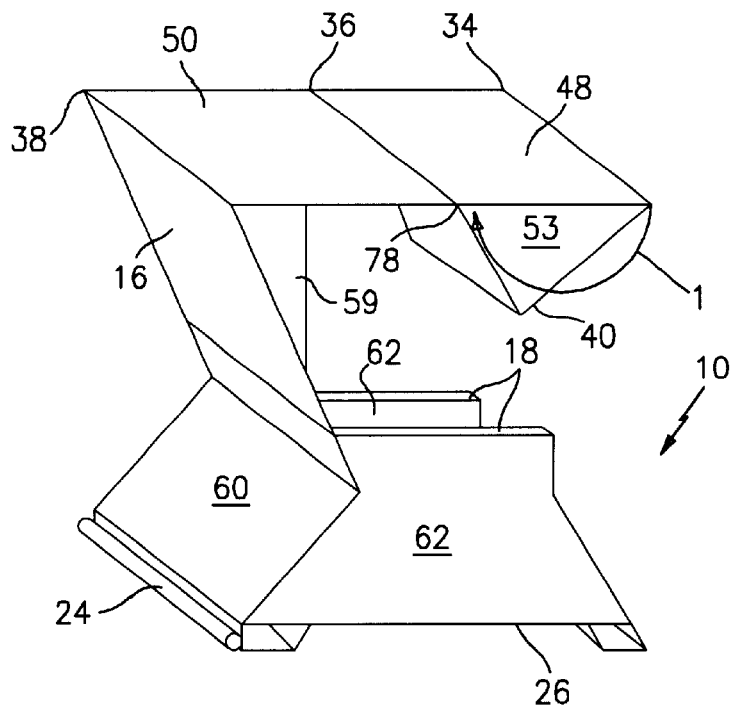
*FIG. 6*
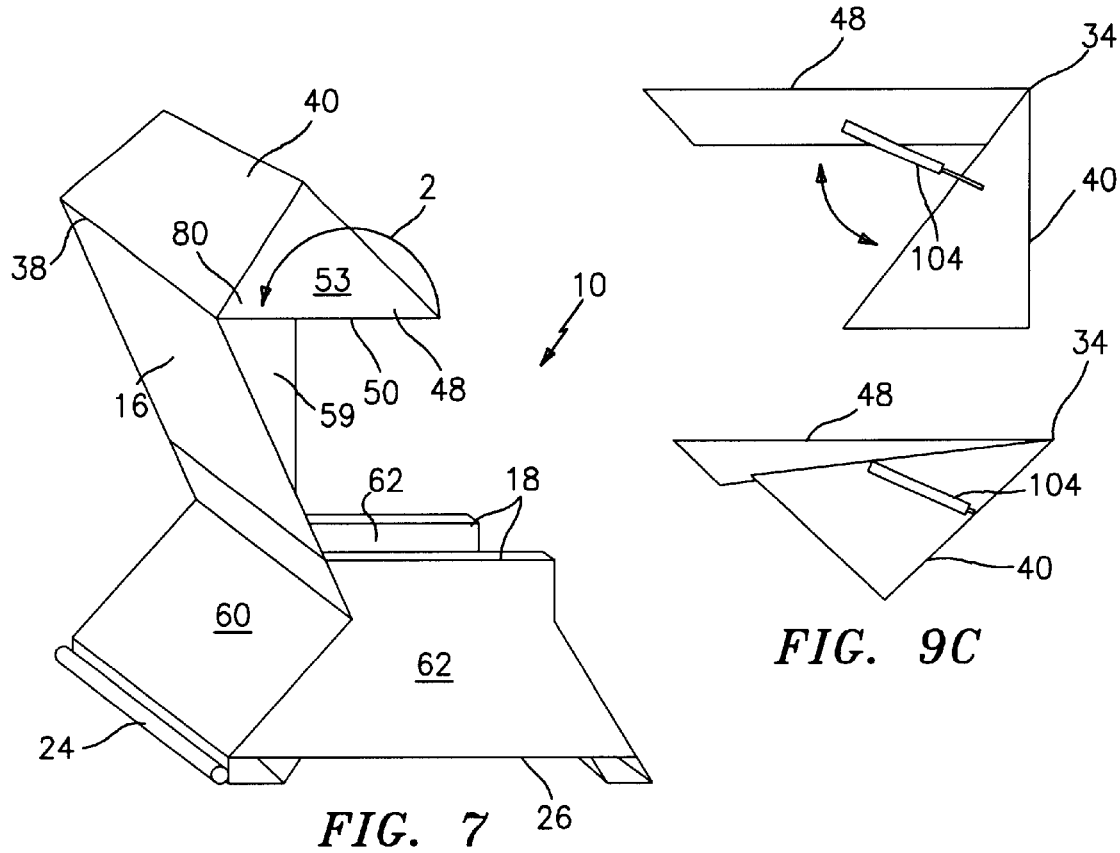
*FIG. 7*
*FIG. 9C*

PORTABLE COMPACT THEATRE BOOTH

TECHNICAL FIELD

The present invention relates generally to booths for audio and visual equipment. More particularly, the present invention relates to a portable compact theatre booth for audio and visual equipment.

BACKGROUND OF THE INVENTION

Over the years, private viewing of a television or computer monitor has become more common for entertainment purposes conducted in private or public areas, or for educational purposes also conducted in private or public areas. As technology has advanced, for example, an employer may conduct on-the-job training by having a trainee watch an instructional or training program presented on a video, or perform computer-related tasks such as flight simulation. However, considering the scarcity of office space, it is often inconvenient and expensive to provide a separate office room for purposes of viewing such training tapes.

In the past, private viewing of television or computer monitors has been accomplished by use of small, hooded monitors. Unfortunately, the use of a small, hooded monitor does not isolate the viewer from his or her surroundings, which can be noisy and distracting. Another method has been to provide a booth in which the viewer sits to watch the television or computer monitor. Such booths are often soundproofed to allow the viewer to concentrate on the monitor without distraction from the environment surrounding the booth. Unfortunately, such booths are large and take up space in what may be a crowded office or factory floor.

Therefore, there is a need for a compact, personal viewing booth offering isolation from the environment so that viewing and listening will not be disturbed.

SUMMARY OF THE INVENTION

A portable viewing booth, which is adapted to accommodate a viewer therein, comprises a support frame, a chair having a seat portion and a back rest portion extending from the seat portion wherein the chair is mounted on the support frame. A frame member is pivotally attached to the back rest portion and adapted to fold and be stored behind the chair. The frame member is adapted to cover the viewer while seated on the chair, and a display screen, speakers, and other devices are mounted is on the frame member.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings in which:

FIGS. 4 through 8 are isometric views of the present invention illustrating the viewing booth transforming from a viewing configuration to a non-use configuration;

FIG. 9C is a cross sectional view of FIG. 9 taken along the line C—C; and

DETAILED DESCRIPTION OF THE INVENTION

Figure 1:
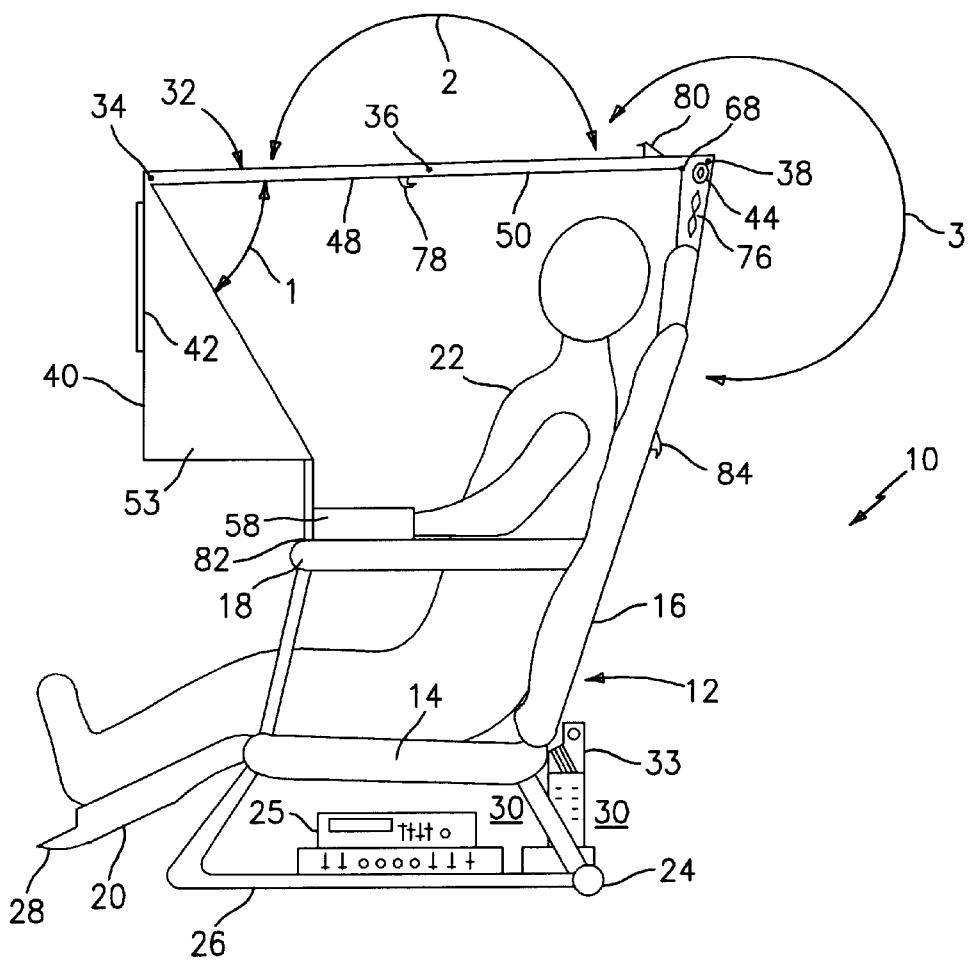
FIG. 1 is a side perspective view of the present invention where the folding traverse movement of frame member is illustrated.

Referring now to the figures, illustrated in FIG. 1 is a side view of a viewing booth generally designated at 10. Viewing booth 10 generally comprises a chair 12, which includes a seat portion 14 and a backrest portion 16 attached to seat portion 14. Backrest portion 16 extends in an upward direction from seat portion 14. A pair of opposing arm rests 18 are attached to seat portion 14 and to back rest portion 16 at opposing sides of chair 12. A leg rest 20 extends from seat portion 16 and provides a greater comfort for a viewer 22 while seated in chair 12. Moreover, chair 12 is mounted on a support frame portion 26 attached to the bottom of seat portion 14.

Booth 10 further includes a roller 24, or a plurality of wheels in the alternative, disposed on support frame portion 26 of booth 10 wherein roller 24 provides for transportability of booth 10 from one location to a desired location. In order to assist in transporting booth 10, leg rest 20 further includes a handle 28 extended outwardly from the edge of leg rest 20 for lifting booth 10 off the ground pivotally relative to roller 24 wherein booth 10 may be pushed or pulled on roller 24. Alternatively, back rest portion 16 may include a handle 68 allowing a user to tilt booth 10 in the other direction relative to roller 24 and transport booth 10 to a desired location by pushing or pulling booth 10.

Booth 10 further includes a boxed-in or enclosed compartment section 30 preferably disposed underneath, or alternatively behind seat portion 14 of chair 12, wherein video and audio/visual sources 25 such as, but not limited to, a DVD player, a VCR, a computer, subwoofer, and a surround sound system may be stored therein.

In order to provide a segregated viewing area for viewer 22, booth 10 further includes a frame member 32 capable of folding at various hinge point locations to allow booth 10 to be transformed from a viewing configuration (FIG. 2), into a non-use or storage configuration (FIG. 3) at the conclusion of a viewing. In the non-use or storage configuration (FIG. 3) chair 12 may be utilized as an ordinary chair, or simply stored away.

Frame member 32 is made of a plurality of sub-frame members pivotally attached to one another at a first hinge point 34, a second hinge point 36, and a third hinge point 38. A display screen 42 such as, but not limited to, a flat screen monitor, is preferably suspended from the interior side of a sub-frame member 40, which is pivotally attached to sub-frame member 48 at first hinge point 34. Display screen 42 is in facing relation with viewer 22 while in use position. The use of a flat display screen monitor, allows for easier storage and folding capabilities of frame 32.

The retraction and folding of frame member 32 is illustrated by folding sub-frame member 40 in a counter clockwise direction, generally depicted at 1, about first hinge point 34, to a position where sub-frame member 40 will ultimately secure underneath sub-frame member 48 via a latching device 78 disposed between first hinge point 34 and second hinge point 36. Next, sub-frame member 48, with sub-frame member 40 secured underneath, pivotally rotates and folds in a clock-wise direction, generally depicted at 2, about second hinge point 36 to where sub-frame member 48 is secured via a latching device 80 on top of sub-frame member 50. Finally, sub-frame member 50, which is pivotally attached to chair 12 at third hinge point 38, with the sub-frame members 40 and 48 positioned on its top surface, pivotally rotates and folds in a clock-wise direction, generally depicted at 3, about third hinge point 38 to a stored position behind chair 12 wherein the frame member 32 is transformed into a fully folded position and secured via a latching device 84 behind back rest portion 16 of chair 12. This complete folded position of frame member 32 transforms booth 10 to non-use position wherein chair 12 may be utilized as an ordinary chair, or be stored away for later use.

Figure 2:
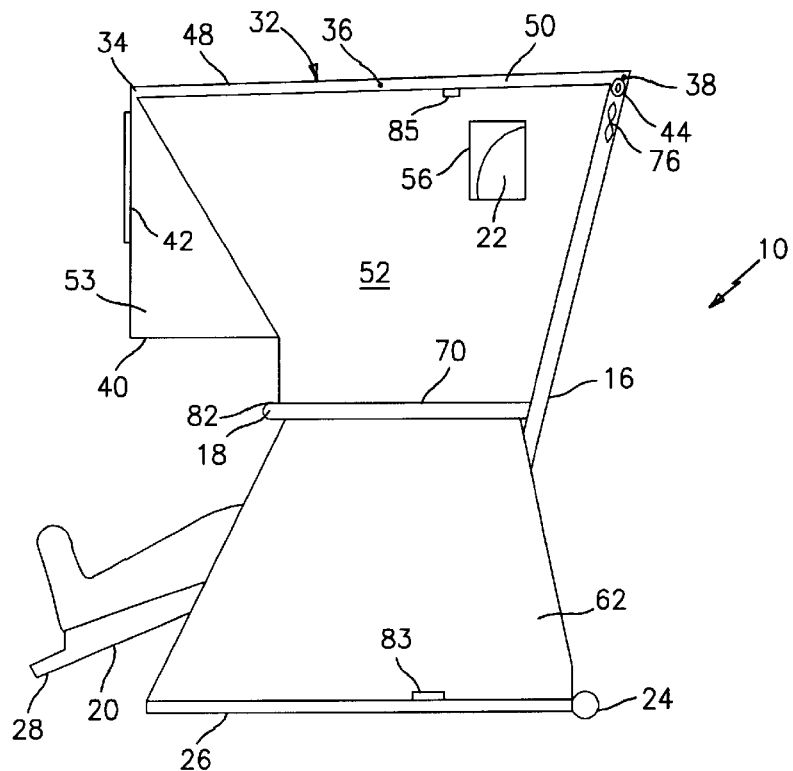
FIG. 2 is a side perspective view of the present invention in a viewing position.
Figure 3:
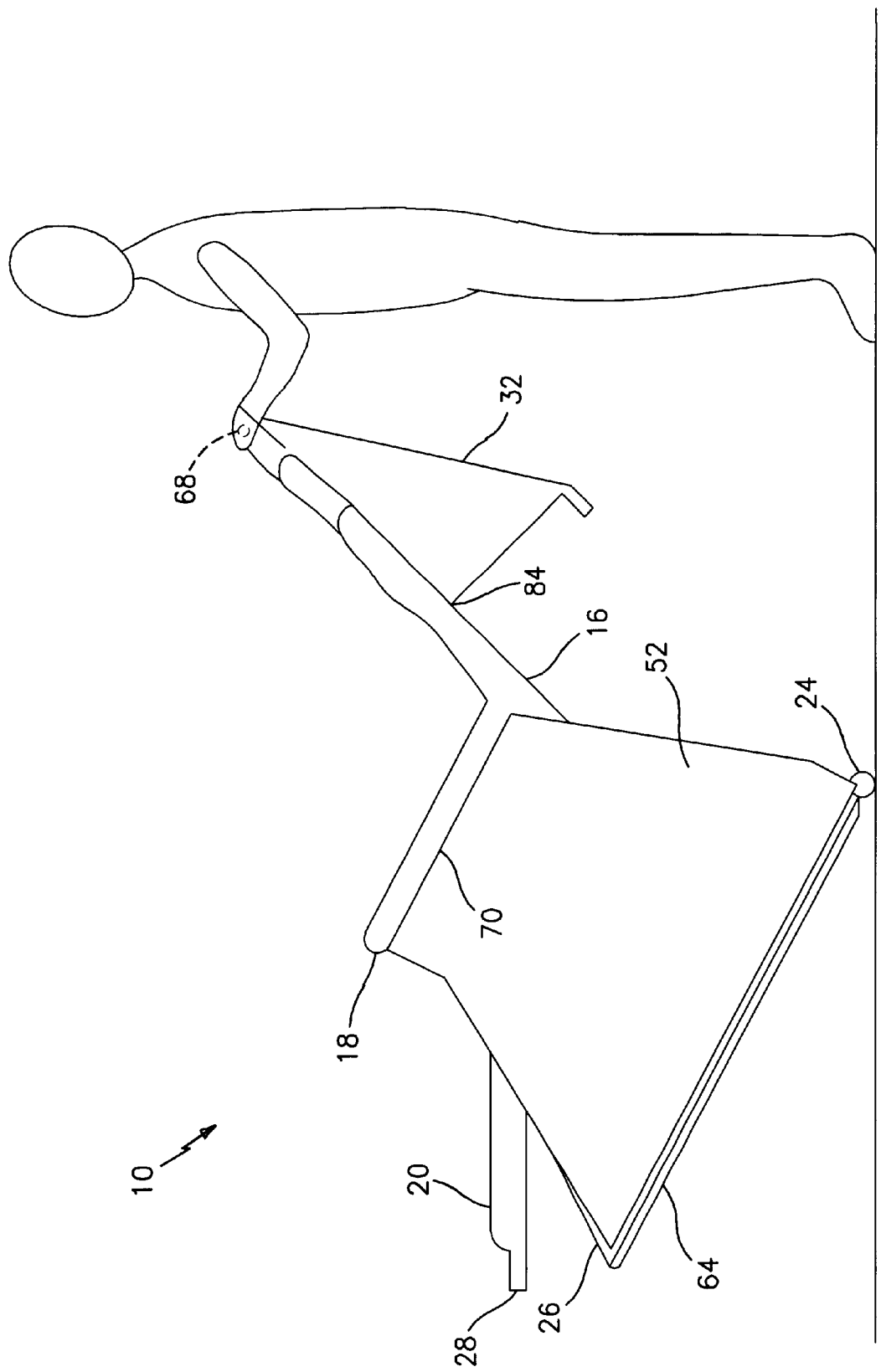
FIG. 3 is a side perspective view of the present invention in a non-use folded position.

Referring to FIG. 2, in order to create a completely segregated viewing area for viewer 22, booth 10 further comprises a pair of opposing sidewalls 52 and 54. Sidewall 52 is pivotally attached along the peripheral edge of armrest 18 at a hinge point 70 and terminates at frame member 32 at the opposing free end. Similarly, sidewall 54 is pivotally attached along the peripheral edge of the other armrest 18 at a hinge point 71, and terminates at frame member 32 at the opposing free end.

In transforming booth 10 from a viewing configuration to a non-use configuration, or vice versa, sidewall 52 pivotally rotates and folds in a counter clock-wise or counter clock-wise direction about hinge point 70 to ultimately rest and secure against frame member 32 via a latching device 85 in an enclosed viewing configuration, and rest and secure against frame portion 26 via a latching device 83 in a non-use configuration. Similarly, sidewall 54 pivotally rotates and folds in a clock-wise or counter clock-wise direction about hinge point 71 to also ultimately rest and secure against opposing side of frame member 32 via latching device 85 in an enclosed viewing configuration, and rest and secure against the other side of frame portion 26 via latching device 83 in a non-use configuration. Folding and retracting of other sub-frame members of frame member 32 may follow in the same way as discussed before. It is also contemplated that each sidewall 52 and 54 to include a window 56, preferably slideable, to allow viewer 22 a view of the external surrounding of booth 10 while inside booth 10.

Figure 5:
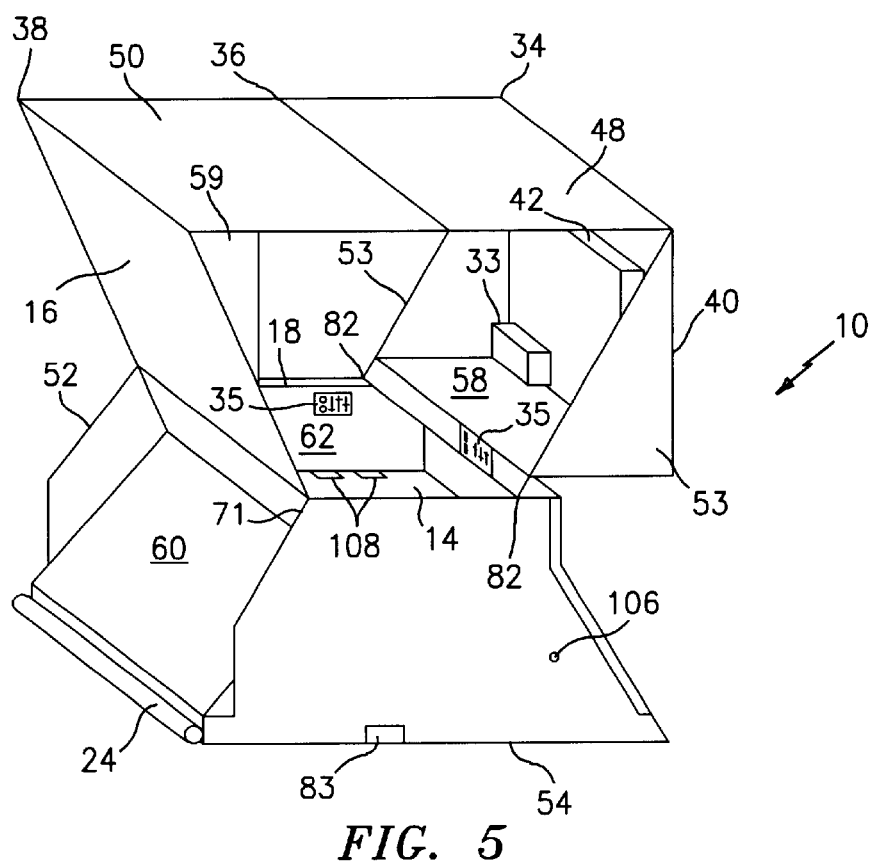

As best seen in FIG. 5, sub-frame member 40 may include a tray portion 58, which preferably extends over viewer's lap, and provides viewer 22 with a place to rest food or beverage while inside booth 10. Additionally, tray portion 58 or sub-frame member 40 may have speakers 33 or audio/visual controls 46 mounted thereon. Alternatively, when a computer is utilized, tray portion 58 may be used to place a keyboard, joystick, or a mouse thereon.

Figure 4:
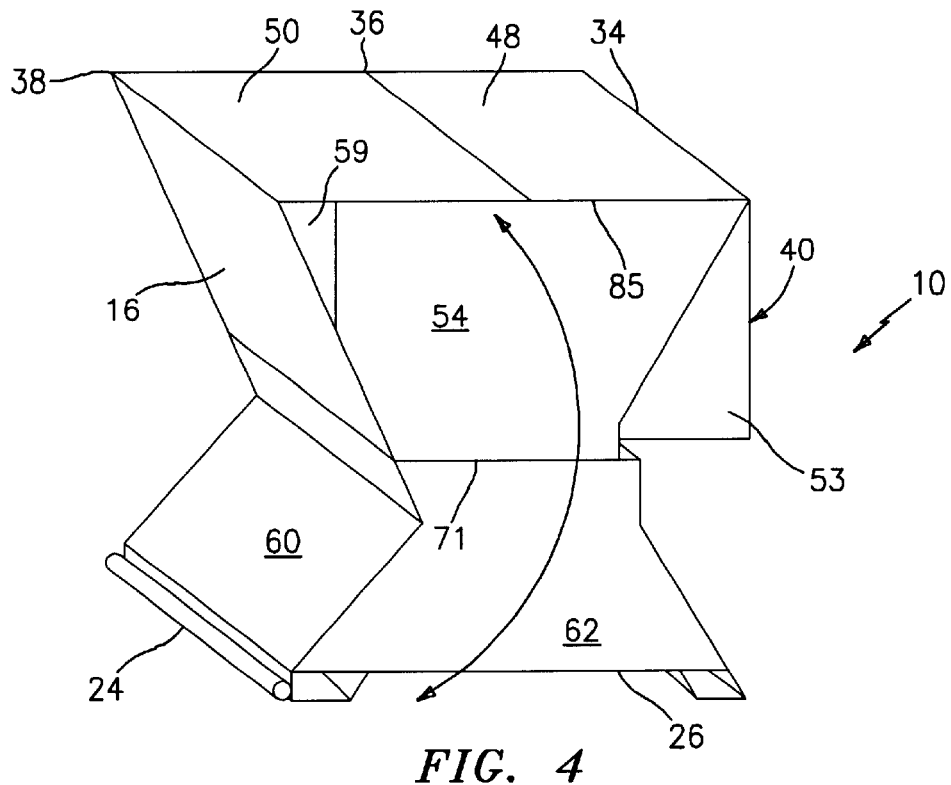

Referring to FIG. 4, viewing booth 10 is illustrated in a viewing configuration. As will be described herein, this embodiment contemplates sub-frame member 40 to pivotally fold inwardly where sub-frame member 40 will ultimately secure on the bottom surface of sub-frame member 48. Further, this embodiment includes removable side panels 62, back panel 60, and bottom panel 64 (FIG. 3) to allow access to compartment 30. In addition, a pair of opposing sidewalls 53 extend from sub-frame member 40 to tray portion 58.

Referring to FIG. 5, sidewalls 52 and 54 are illustrated in an open configuration where each sidewall 52 and 54 rests next to each side of chair 12 and are secured over side panels 62 via latching device 83. Each sidewall 52 and 54 is pivotally attached to a corresponding arm rest 18 with at hinge points 70 and 71 respectively, where each sidewall 52 and 54 is to fold onto the side of chair 12. Sub-frame member 40 is secured to arm rest 18 at attach point 82. Handles 106 disposed on each sidewall 52 and 54 allow the viewer 22 to open and close sidewalls 52 and 54 while the viewer 22 is seated in chair 12. The seat portion 14 of chair 12 may include sound holes 108 disposed therein. Sound holes 108 communicate with speakers (not shown) or a subwoofer (not shown) mounted within enclosed compartment 30 (FIG. 1). Sound holes 108 allow the sound from the speakers or subwoofer to reach the viewer 22. Also shown in FIG. 5 are support braces 59, which extend from side edges of back rest portion 16 to support sub-frame member 50.

Referring to FIG. 6, sub-frame member 40 is illustrated in a folded position. As stated earlier, this embodiment contemplates that sub-frame member 40 pivots and folds in a clock-wise direction about first hinge point 34, and then ultimately secured to the bottom surface of sub-frame member 48 with latching device 78.

Figure 8:
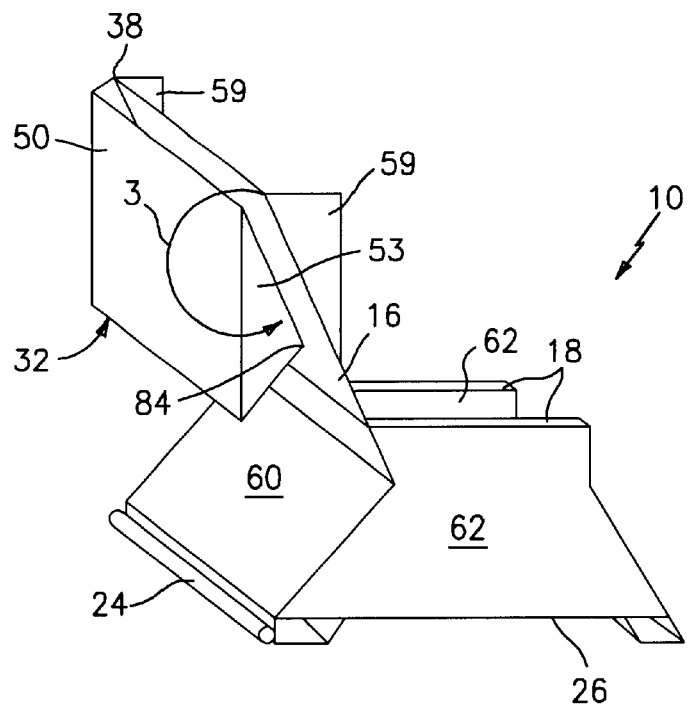

Referring to FIG. 7, sub-frame member 48, with sub-frame member 40 secured to its bottom surface, is illustrated in a folded configuration. As stated earlier, sub-frame member 48 pivots and folds in a counter clock-wise direction about second hinge point 36 until sub-frame member 48 ultimately rests on the top surface of sub-frame member 50 and is secured with latch device 80. Finally, referring to FIG. 8, sub-frame member 50, which is pivotally attached to chair 12 at third hinge point 38, with the sub-frame members 40 and 48 positioned on its top surface, pivotally rotates and folds in a counter clock-wise direction about third hinge point 38 to a stored position behind chair 12 wherein the frame member 32 is transformed into a fully folded position and secured with latching device 84 behind back rest portion 16 of chair 12. This complete folded position of frame member 32 transforms booth 10 to non-use position wherein chair 12 may be utilized as an ordinary chair, or be stored away for later use.

Figure 9A:
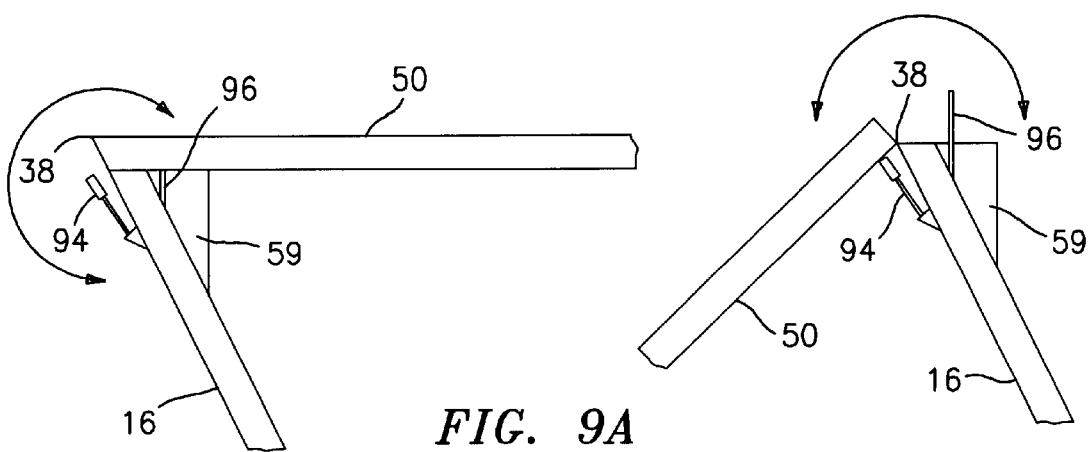
FIG. 9A is a cross sectional view of FIG. 9 taken along the line A—A.
Figure 9B:
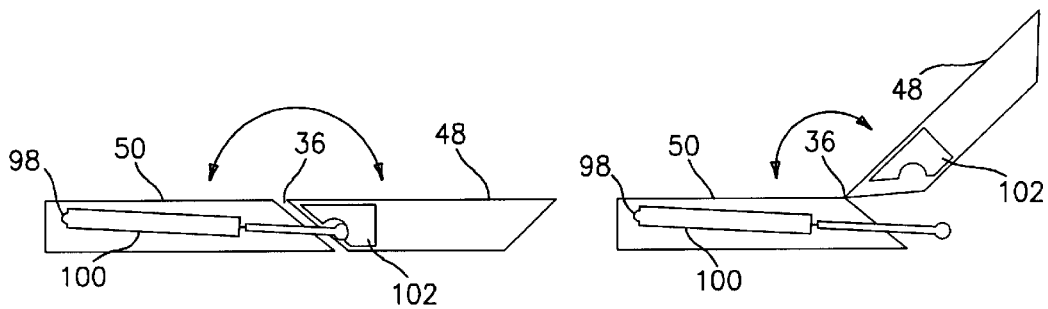
FIG. 9B is a cross sectional view of FIG. 9 taken along the line B—B.
Figure 9:
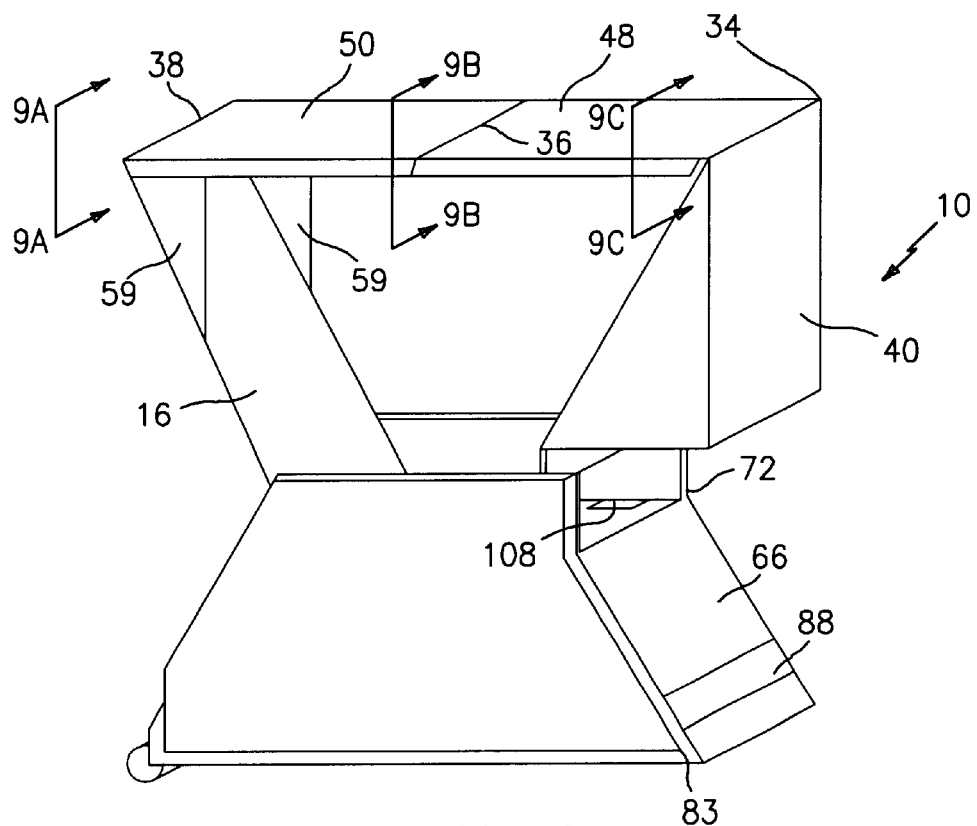
FIG. 9 is another isometric view of the present invention illustrating other structural features.

Referring to FIG. 9, booth 10 is illustrated having a front panel 66 pivotally hinged at 72. Front panel 66, an alternative to leg rest 20, provides access to compartment section 30. In order to assist in transforming booth 10 from a viewing position to a non-use position, or vice-versa, that is to transform frame member 32 into a complete folded or unfolded positions, strut mechanisms 94, 96, 100, and 104 assist viewer 22, or a user, to perform the task of folding and unfolding the sub-frame members. It should be appreciated that each of the strut mechanisms may be of a type such as, but not limited to, hydraulic operated, spring operated, or air operated. Additionally, more than one of any of the strut mechanisms may be utilized as design variations, such as the weight of the sub-frame members, require.

Referring to FIG. 9A, strut mechanisms 94 and 96 are illustrated. Strut mechanism 96 is pivotally attached to back rest portion 16, preferably on support brace 59, at one end. As sub-frame member 50 is rotated in a counter clock-wise direction from the viewing configuration to the storage configuration, the rotation of sub-frame member 50 is assisted by strut mechanism 96. As sub-frame member 50 is rotated in a clock-wise direction to transform the booth 10 into a viewing configuration, sub-frame member 50 rests on the opposing end of strut mechanism 96 thereby allowing sub-frame member 50 to rotate smoothly. Strut mechanism 94 is pivotally attached to back rest portion 16 of chair 12 and assists in the clock-wise rotation of sub-frame member 50 when transforming sub-frame member 50 from the storage configuration to a viewing configuration. Strut mechanism 94 also allows sub-frame member 50 to rotate smoothly in the counter clock-wise direction as sub-frame member 50 pivots to rest behind chair 12.

Referring to FIG. 9B, strut mechanism 100 is illustrated. Strut mechanism 100 is pivotally connected to sub-frame member 50 at pivot point 98, and rests within a receptacle 102 disposed on sub-frame member 48 at the opposing end. Strut mechanism 100 is configured so as sub-frame member 48 pivots in a clock-wise direction, the opposing end is inserted into receptacle 102 thereby assisting sub-frame member 48 to rotate in the counter clock-wise direction and allowing sub-frame member 48 to rotate smoothly downward in the clock-wise direction.

Referring to FIG. 9C, strut mechanism 104 is illustrated. Strut mechanism 104 is pivotally attached to sub-frame member 48 at one end, and to sub-frame member 40 at the opposing end. Strut mechanism 104 assists in pivotal movement of sub-frame member 40. Strut mechanism 104 assists the user to pivotally fold sub-frame member 40 into a viewing or non-use configurations.

Figure 10:
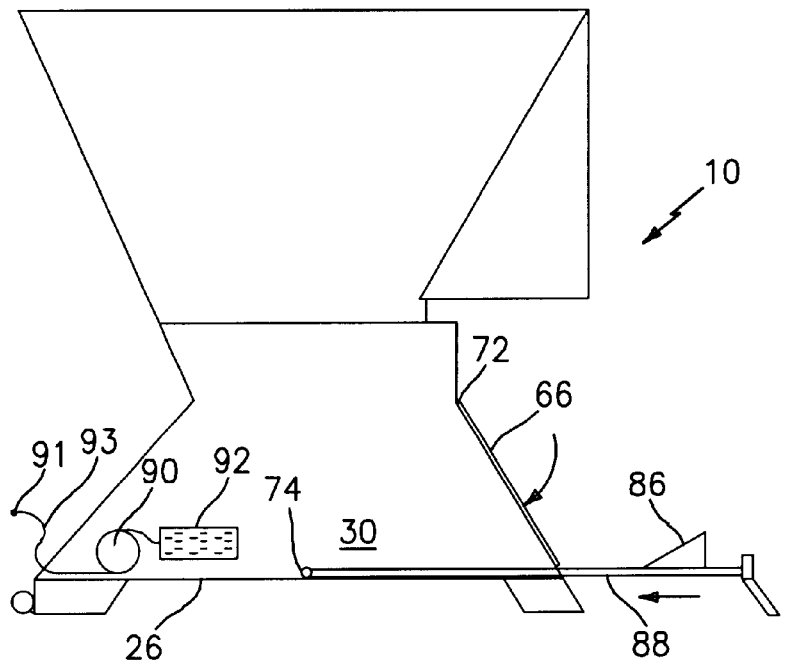

Referring to FIG. 10, additional structural features for an alternative embodiment of booth 10 is illustrated in a flight training device configuration. As a flight training device, the booth provides the trainee with a confined space (similar to an aircraft cockpit) where he may focus his attention on specific flight training actions without outside distraction, thus creating a more realistic environment. To further reproduce an aircraft cockpit and flying instruments, booth 10 includes a pedal frame member 88 slideably disposed on top surface of support frame portion 26 wherein pedal frame member 88 is capable of sliding in and out compartment area 30. Pedal frame member 88 further includes a pair of pedals 86, such as those commercially available for computerized flight simulation programs, disposed on a top surface of pedal frame member 88, and within the reach of a trainee's feet in a fully extended configuration, as is illustrated here.

Figure 13:
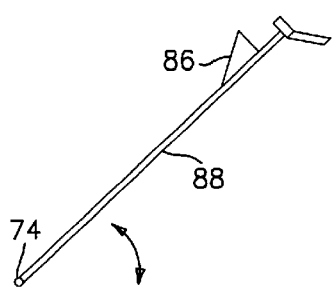
FIGS. 10 through 13 are side isometric views of the present invention illustrating the retraction sequence of a pedal frame member into the viewing booth.
Figure 11:
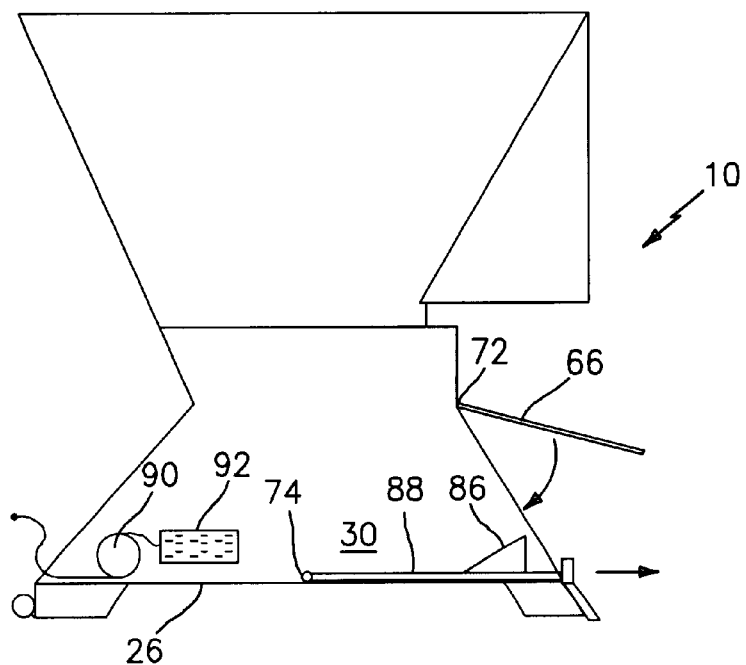
Figure 12:
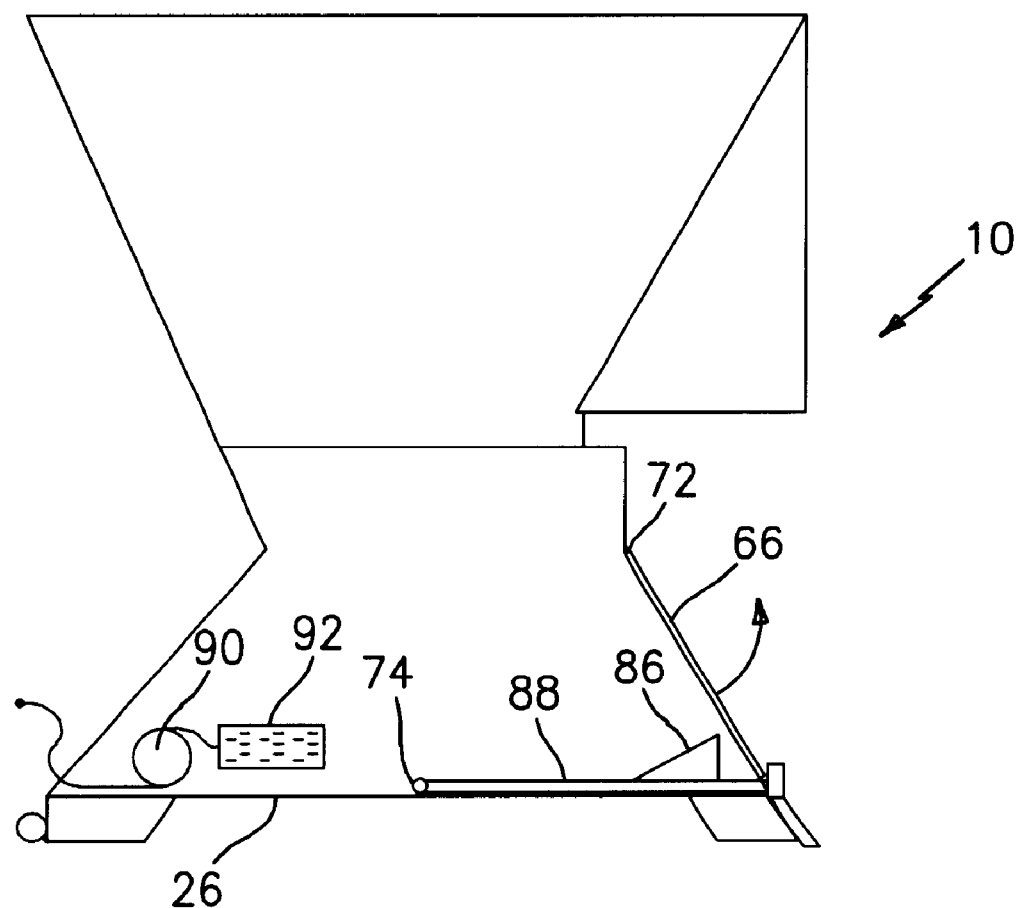

In order to retract pedal frame member 88 into a stored position, as illustrated in FIG. 11, hinged front panel 66 is pivotally lifted about hinge point 72, and pedal frame member 88 is then slid into stored position inside compartment 30. Front panel 66 is then pivotally brought down into a closed position, as illustrated in FIG. 12. It should also be appreciated that pedal frame member 88 may pivot about a hinge point 74 to allow a trainee to adjust the height of the pedals 86 to a desired height (FIG. 13).

Another structural feature of booth 10 is a power plug 91 that provides electrical power to a plurality of electrical receptacles 92 via electrical wiring 93. Receptacles 92 are mounted within compartment section 30 to receive electrical plugs from the various audio/visual sources 25 (FIG. 1) mounted therewithin. Electrical wiring 93 is mounted on a reel 90, which is mounted within compartment section 30. Reel 90 allows wiring 93 to be extended from compartment section 30 when booth 10 is in the viewing configuration, and withdraws wiring 93 when booth 10 is in the storage configuration.

All structural components of the preferred embodiment of the present invention are constructed from rigid material such as, but not limited to, metal, wood, plastic, fiberglass, composite material, or combinations thereof. Moreover, design variations as to the width of the booth, or the booth being capable of accommodating more than one viewer are also contemplated to be within the scope of the present invention. Also, the use of accessories for comforting the viewer such as, but not limited to, a fan 76 and a light source inside the booth are contemplated to be within the scope of the present invention.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A portable viewing booth adapted to accommodate a viewer therein, said viewing booth comprising:
    a support frame;
    a chair mounted on said support frame, said chair having a seat portion and a back rest portion extending from said seat portion;
    a frame member pivotally attached to said back rest portion and adapted to fold and be stored behind said chair, said frame member further adapted to cover the viewer while the viewer is seated on said chair; and
    a display screen mounted on said frame member.

2. The portable viewing booth recited in claim 1 wherein said frame member includes:
    a first sub-frame member;
    a second sub-frame member pivotally attached to said first sub-frame member;
    a third sub-frame member pivotally attached to said second sub-frame member at one end and pivotally attached to said back rest portion at an opposing end, said display screen is mounted on said first sub-frame member.

3. The portable viewing booth recited in claim 2 further comprising:
    an arm rest mounted on said chair; and
    a sidewall pivotally attached to said armrest, said sidewall extending from said armrest to said frame member.

4. The portable viewing booth recited in claim 3 wherein said sidewall includes a window opening.

5. The portable viewing booth recited in claim 1 further comprising:
    a roller rotatably disposed on said support frame and in contact with a surface, wherein said roller allows for said booth to be transported across said surface.

6. The portable viewing booth recited in claim 1 wherein said display screen is a flat screen monitor.

7. The portable viewing booth recited in claim 1 further comprising:
    a compartment disposed within said support frame under said chair, said compartment being configured to store audio/visual equipment.

8. The portable viewing booth recited in claim 1 further comprising:
    a compartment disposed within said support frame under said chair, said compartment being configured to store a computer.

9. The portable viewing booth recited in claim 2 further comprising:
    a tray portion attached to said first sub-frame member.

10. The portable viewing booth recited in claim 9 further comprising:
    audio/visual or computer control equipment disposed on said tray portion.

11. The portable viewing booth recited in claim 2 further comprising:
- a first strut mechanism extending between said first and second sub-frame members;
- a second strut mechanism extending between said second and third sub-frame members; and
- a third strut mechanism extending between said third sub-frame member and said backrest portion, said strut mechanisms assisting in pivotal movement of said sub-frame members.

12. The viewing booth recited in claim 1 further comprising:
- a pedal frame member slideably disposed within said support frame;
- a pedal mounted to said pedal frame member.

13. The viewing booth recited in claim 7 further comprising:
- a plurality of electrical receptacles disposed within said compartment;
- an electrical wire connected to said plurality of electrical receptacles; and
- a reel disposed within said compartment, said reel adapted to accept said electrical wire.

14. The viewing booth recited in claim 8 further comprising:
- a plurality of electrical receptacles disposed within said compartment;
- an electrical wire connected to said plurality of electrical receptacles; and
- a reel disposed within said compartment, said reel adapted to accept said electrical wire.

* * * * *

UNITED STATES PATENT AND TRADEMARK OFFICE
CERTIFICATE OF CORRECTION

PATENT NO. : 6,354,044 B1
DATED : March 12, 2002
INVENTOR(S) : Lagace, Jr.

It is certified that error appears in the above-identified patent and that said Letters Patent is hereby corrected as shown below:

Column 1,
Line 47, after "mounted" delete "is"

Column 2,
Line 24, after "portion" delete "16" and insert therefor -- 14 --

Column 3,
Line 30, after "a" delete "counter"
Line 44, after "54" insert therefor -- is --

Column 4,
Line 3, after "18" delete "with"
Line 30, after "with" delete "latch" and insert therefor -- latching --
Line 48, after "unfolded" delete "positions" and insert therefor -- position --

Column 5,
Line 22, after "into" delete "a"

Signed and Sealed this

Twenty-first Day of June, 2005

JON W. DUDAS
*Director of the United States Patent and Trademark Office*